United States Patent
Fries et al.

(10) Patent No.: US 9,448,017 B2
(45) Date of Patent: Sep. 20, 2016

(54) TEMPERATURE CONTROL SYSTEM FOR AN ELECTROCHEMICAL VOLTAGE SOURCE

(71) Applicant: W.E.T. Automotive Systems AG, Odelzhausen (DE)

(72) Inventors: Thomas Fries, Shanghai (CN); Hauk Yingqiu Hou, Langfang (CN); Andy (Jianming) Liu, Langfang (CN); Jonathan Yu Zhang, Tianjin (CN); Hans-Georg Rauh, Olching (DE)

(73) Assignee: GENTHERM GMBH, Odelzhausen (DE)

( * ) Notice: Subject to any disclaimer, the term of this patent is extended or adjusted under 35 U.S.C. 154(b) by 441 days.

(21) Appl. No.: 13/705,714

(22) Filed: Dec. 5, 2012

(65) Prior Publication Data

US 2013/0149574 A1  Jun. 13, 2013

(30) Foreign Application Priority Data

Dec. 9, 2011 (DE) .......................... 10 2011 120 640
Aug. 3, 2012 (DE) .......................... 10 2012 015 213
Oct. 19, 2012 (DE) .......................... 10 2012 020 516

(51) Int. Cl.

| F28F 13/12 | (2006.01) |
| H01M 10/48 | (2006.01) |
| H01M 10/63 | (2014.01) |
| H01M 10/6556 | (2014.01) |
| H01M 10/617 | (2014.01) |
| H01M 10/633 | (2014.01) |

(52) U.S. Cl.
CPC .............. *F28F 13/12* (2013.01); *H01M 10/48* (2013.01); *H01M 10/617* (2015.04); *H01M 10/63* (2015.04); *H01M 10/6556* (2015.04); *H01M 10/633* (2015.04)

(58) Field of Classification Search
CPC ......... H01M 10/502; H01M 10/5022; H01M 10/5016; H01M 10/63; H01M 10/633
See application file for complete search history.

(56) References Cited

U.S. PATENT DOCUMENTS

| 1,370,832 A | 3/1921 | Mollberg |
| 1,439,681 A | 12/1922 | Alkire et al. |
| 1,514,329 A | 11/1924 | Metcalf |
| 2,022,959 A | 12/1935 | Gordon |
| 2,158,801 A | 5/1939 | Petterson |

(Continued)

FOREIGN PATENT DOCUMENTS

| DE | 37 02 756 | 10/1988 |
| DE | 19503291 | 8/1996 |

(Continued)

OTHER PUBLICATIONS

Excerpt from website http://www.seatcomfort.com/ventilation.htm. Specializing in Seat Ventilation and Heating Systems, Ventilation.

(Continued)

*Primary Examiner* — Jeremiah Smith

(74) *Attorney, Agent, or Firm* — The Dobrusin Law Firm, P.C.

(57) ABSTRACT

The present invention refers to a temperature control system for an electrochemical voltage source. It is planned that the temperature control system comprises a fluid moving device for moving a fluid for controlling the temperature of the voltage source.

17 Claims, 3 Drawing Sheets

(56) References Cited

U.S. PATENT DOCUMENTS

| | | |
|---|---|---|
| 2,703,134 A | 3/1955 | Mossor |
| 2,756,532 A | 8/1956 | Awe |
| 2,782,834 A | 2/1957 | Vigo |
| 2,791,956 A | 5/1957 | Guest |
| 2,826,135 A | 3/1958 | Benzick |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,653,590 A | 4/1972 | Elsea |
| 3,681,797 A | 8/1972 | Messner |
| 3,684,170 A | 8/1972 | Roof |
| 3,736,022 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,060,276 A | 11/1977 | Lindsay |
| 4,065,936 A | 1/1978 | Fenton et al. |
| 4,072,344 A | 2/1978 | Li |
| 4,141,585 A | 2/1979 | Blackman |
| 4,259,896 A | 4/1981 | Hayashi et al. |
| 4,413,857 A | 11/1983 | Hayashi |
| 4,509,792 A | 4/1985 | Wang |
| 4,572,430 A | 2/1986 | Takagi et al. |
| 4,589,656 A | 5/1986 | Baldwin |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,354,117 A | 10/1994 | Danielson et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,887,304 A | 3/1999 | Von der Heyde |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,059,018 A | 5/2000 | Yoshinori et al. |
| 6,062,641 A | 5/2000 | Suzuki et al. |
| 6,064,037 A | 5/2000 | Weiss et al. |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,109,688 A | 8/2000 | Wurz et al. |
| 6,119,463 A | 9/2000 | Bell |
| 6,145,925 A | 11/2000 | Eksin et al. |
| 6,164,719 A | 12/2000 | Rauh |
| 6,179,706 B1 | 1/2001 | Yoshinori et al. |
| 6,186,592 B1 | 2/2001 | Orizaris et al. |
| 6,189,966 B1 | 2/2001 | Faust et al. |
| 6,196,627 B1 | 3/2001 | Faust et al. |
| 6,223,539 B1 | 5/2001 | Bell |
| 6,224,150 B1 | 5/2001 | Eksin et al. |
| 6,263,530 B1 | 7/2001 | Feher |
| 6,273,181 B1 | 8/2001 | Matsui et al. |
| 6,273,810 B1 | 8/2001 | Rhodes et al. |
| 6,277,023 B1 | 8/2001 | Schwartz |
| 6,291,803 B1 | 9/2001 | Fourrey |
| 6,300,150 B1 | 10/2001 | Venkatasubramanian |
| 6,478,369 B1 | 11/2002 | Aoki et al. |
| 6,481,801 B1 | 11/2002 | Schmale |
| 6,491,578 B2 | 12/2002 | Yoshinori et al. |
| 6,497,275 B1 | 12/2002 | Elliot |
| 6,505,886 B2 | 1/2003 | Gielda et al. |
| 6,511,125 B2 | 1/2003 | Gendron |
| 6,539,725 B2 | 4/2003 | Bell |
| 6,541,737 B1 | 4/2003 | Eksin et al. |
| RE38,128 E | 6/2003 | Gallup et al. |
| 6,578,910 B2 | 6/2003 | Andersson et al. |
| 6,592,181 B2 | 7/2003 | Stiller et al. |
| 6,598,405 B2 | 7/2003 | Bell |
| 6,604,785 B2 | 8/2003 | Bargheer et al. |
| 6,606,866 B2 | 8/2003 | Bell |
| 6,619,736 B2 | 9/2003 | Stowe et al. |
| 6,625,990 B2 | 9/2003 | Bell |
| 6,626,488 B2 | 9/2003 | Pfahler |
| 6,629,724 B2 | 10/2003 | Ekern et al. |
| 6,629,725 B1 | 10/2003 | Kunkel et al. |
| 6,637,210 B2 | 10/2003 | Bell |
| 6,672,076 B2 | 1/2004 | Bell |
| 6,676,207 B2 | 1/2004 | Rauh et al. |
| 6,682,140 B2 | 1/2004 | Minuth et al. |
| 6,685,553 B2 | 2/2004 | Aoki |
| 6,687,937 B2 | 2/2004 | Harker |
| 6,700,052 B2 | 3/2004 | Bell et al. |
| 6,719,534 B2 | 4/2004 | Aoki et al. |
| 6,719,624 B2 | 4/2004 | Hayashi et al. |
| 6,722,148 B2 | 4/2004 | Aoki et al. |
| 6,761,399 B2 | 7/2004 | Bargheer et al. |
| 6,767,621 B2 | 7/2004 | Flick et al. |
| 6,786,541 B2 | 9/2004 | Haupt et al. |

(56) References Cited

U.S. PATENT DOCUMENTS

| | | |
|---|---|---|
| 6,786,545 B2 | 9/2004 | Bargheer et al. |
| 6,793,016 B2 | 9/2004 | Aoki et al. |
| 6,808,230 B2 | 10/2004 | Buss et al. |
| 6,817,675 B2 | 11/2004 | Buss et al. |
| 6,826,792 B2 | 12/2004 | Lin |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,892,807 B2 | 5/2005 | Fristedt et al. |
| 6,893,086 B2 | 5/2005 | Bajic et al. |
| 6,929,322 B2 | 8/2005 | Aoki et al. |
| 6,957,545 B2 | 10/2005 | Aoki |
| 6,976,734 B2 | 12/2005 | Stoewe |
| 7,013,653 B2 | 3/2006 | Kamiya et al. |
| 7,040,710 B2 | 5/2006 | White et al. |
| 7,052,091 B2 | 5/2006 | Bajic et al. |
| 7,070,232 B2 | 7/2006 | Minegishi et al. |
| 7,083,227 B2 | 8/2006 | Brennan et al. |
| 7,114,771 B2 | 10/2006 | Lofy et al. |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,231,772 B2 | 6/2007 | Bell |
| 7,338,117 B2 | 3/2008 | Ibqal et al. |
| 7,356,912 B2 | 4/2008 | Iqbal et al. |
| 7,370,911 B2 | 5/2008 | Bajic et al. |
| 7,827,805 B2 | 11/2010 | Comiskey |
| 8,535,104 B1 * | 9/2013 | Nida ................................ 440/6 |
| 2002/0017102 A1 | 2/2002 | Bell |
| 2002/0150478 A1 | 10/2002 | Aoki |
| 2003/0029173 A1 | 2/2003 | Bell et al. |
| 2004/0195870 A1 | 10/2004 | Bohlender et al. |
| 2005/0066505 A1 | 3/2005 | Iqbal et al. |
| 2005/0067862 A1 | 3/2005 | Iqbal et al. |
| 2005/0093347 A1 | 5/2005 | Bajic et al. |
| 2005/0140189 A1 | 6/2005 | Bajic et al. |
| 2005/0173950 A1 | 8/2005 | Bajic et al. |
| 2005/0200179 A1 | 9/2005 | Bevan et al. |
| 2005/0257541 A1 | 11/2005 | Kadle et al. |
| 2006/0138810 A1 | 6/2006 | Knoll et al. |
| 2006/0152044 A1 | 7/2006 | Bajic et al. |
| 2006/0158011 A1 | 7/2006 | Marlovits et al. |
| 2007/0001507 A1 | 1/2007 | Brennan et al. |
| 2007/0069554 A1 | 3/2007 | Comiskey et al. |
| 2007/0176471 A1 | 8/2007 | Knoll |
| 2010/0134940 A1 * | 6/2010 | Nguyen et al. ............... 361/91.1 |
| 2010/0239892 A1 * | 9/2010 | Kramer ............................ 429/50 |
| 2012/0082871 A1 * | 4/2012 | Simonini et al. ............... 429/50 |

FOREIGN PATENT DOCUMENTS

| | | |
|---|---|---|
| DE | 10013492 | 9/2001 |
| DE | 10030708 | 1/2002 |
| DE | 10144839 | 3/2003 |
| EP | 0 280 213 | 8/1988 |
| EP | 1266794 | 12/2002 |
| EP | 1323573 | 7/2003 |
| FR | 2599683 | 6/1986 |
| JP | 1171509 | 7/1989 |
| JP | 5277020 | 10/1993 |
| JP | 10044756 | 2/1998 |
| JP | 2000125990 | 2/2000 |
| JP | 2001071800 | 3/2001 |
| JP | 2002125801 | 5/2002 |
| JP | 2002234332 | 8/2002 |
| JP | 2004224108 | 8/2004 |
| WO | 96/05475 | 2/1996 |
| WO | 97/09908 | 3/1997 |
| WO | 02/053410 | 7/2002 |
| WO | 03/051666 | 6/2003 |
| WO | 03/077710 | 9/2003 |
| WO | 03/101777 | 12/2003 |
| WO | 2004/028857 | 4/2004 |
| WO | 2004/078517 | 9/2004 |
| WO | 2005/021320 | 3/2005 |
| WO | 2005/035305 | 4/2005 |
| WO | 2005/042301 | 5/2005 |
| WO | 2005/047056 | 5/2005 |
| WO | 2005/068253 | 7/2005 |
| WO | 2005/110806 | 11/2005 |

OTHER PUBLICATIONS

GMT 830 Heating & Ventilation System, IGB Automotive Ltd., by Assignee W.E.T. Automotive Systems, Jun. 2003.

Specializing in Seat Ventilation and Heating Systems, Seat Comfort Systems, http://www.seatcomfort.comsemashow1.htm, Jun. 10, 2003.

* cited by examiner

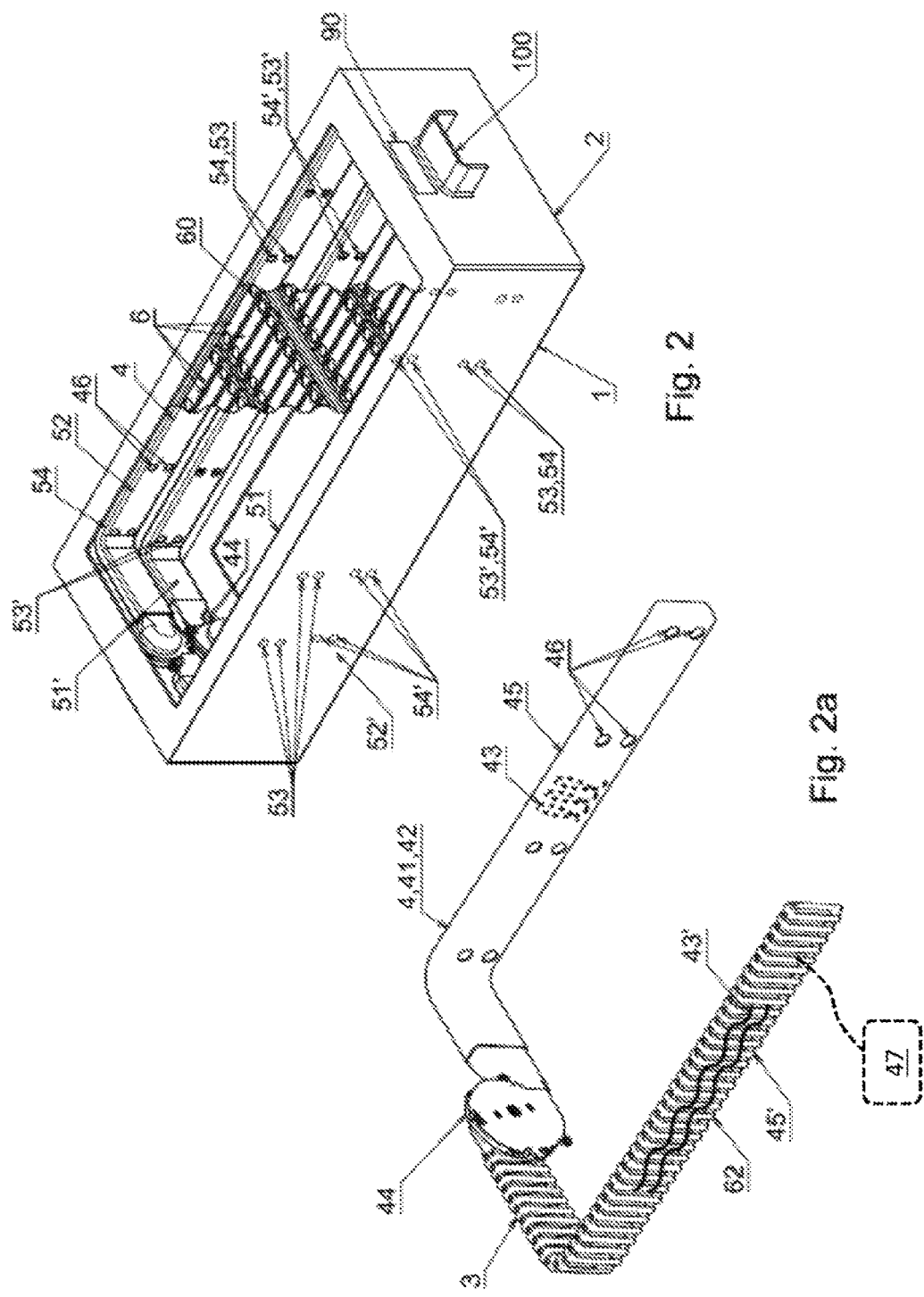

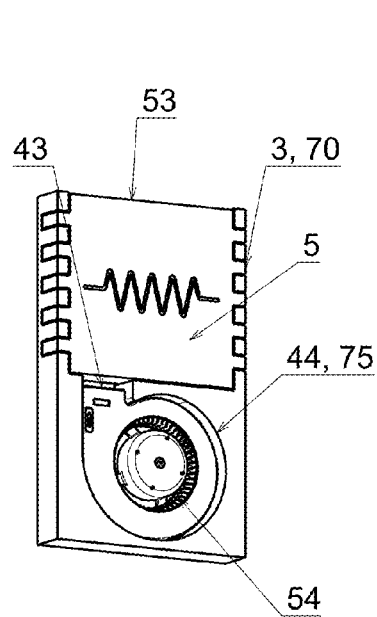
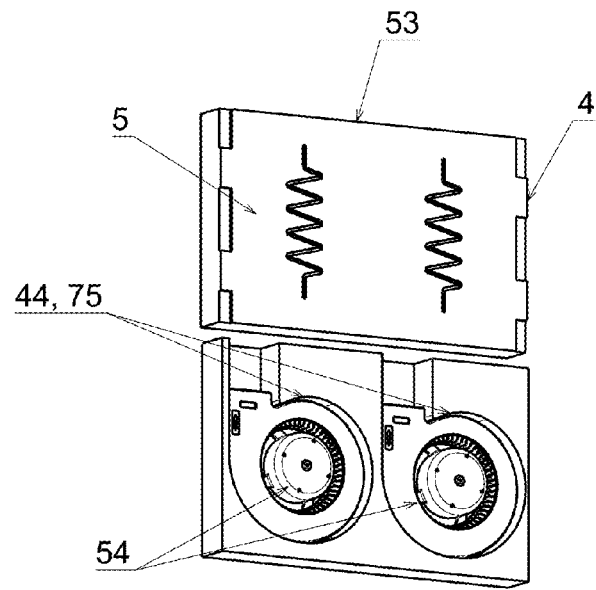
Fig. 3a  Fig. 3b
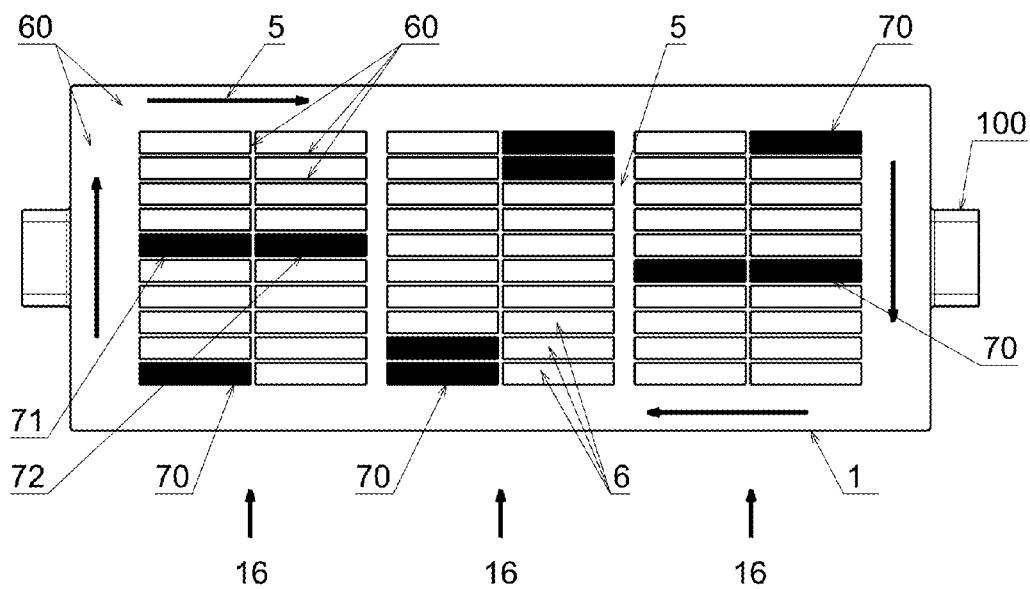
Fig. 4

TEMPERATURE CONTROL SYSTEM FOR AN ELECTROCHEMICAL VOLTAGE SOURCE

BACKGROUND OF THE INVENTION

The present invention relates to a temperature control system for an electrochemical voltage source. For the efficient use of such voltage sources it is advantageous for the temperature to not exceed or fail below specific temperature values. This is because, generally speaking, performance declines at low temperatures. On the other hand, if temperatures are too high, this can have possible detrimental effects on the voltage source or its environment.

It is well known to insulate batteries or to heat them using sheet-like heating elements. However, it is still difficult to achieve precise and homogeneous temperature control.

SUBJECT MATTER OF THE INVENTIONS

To solve this problem a technical concept having the features of a temperature control system for an electrochemical voltage source, wherein the temperature control system comprises a fluid moving device for moving a fluid for controlling the temperature of the voltage source. Further advantageous embodiments can be derived from the further claims and subsequent description.

DRAWINGS

Further details of the invention will be explained in the following description and in the claims. These explanations are intended to make the invention understandable. They are, however, only of an exemplary nature. It goes without saying that any one or several of the described features can be omitted, modified or supplemented within the scope of the invention as defined by independent claims. The features of different embodiments can, of course, also be combined in any way.

What is crucial is that the concept of the invention is implemented in its essence. If a feature is to be implemented at least in part, this implies that the feature is implemented in full or essentially in full. Here, "essentially" means, in particular, that implementation enables achievement of the desired effect to a recognizable extent. This can mean, in particular, that the respective feature is implemented to at least 50%, 90%, 95% or 99%. If a minimum amount is specified, it goes without saying that the implementation of more is not excluded. If the number of components is specified as at least one, this, in particular, also comprises embodiments with two, three or any other plurality of components. Whatever is specified for one object, can be used for the majority or for the entirety of all other equivalent objects. If not otherwise specified, intervals include their beginning and ending points.

In the following reference is made to the drawings, wherein:

FIG. 2 is a perspective view from above of an electrochemical voltage source with a temperature control system, displayed with its cover removed and some of the individual cells removed;

Figure 1:
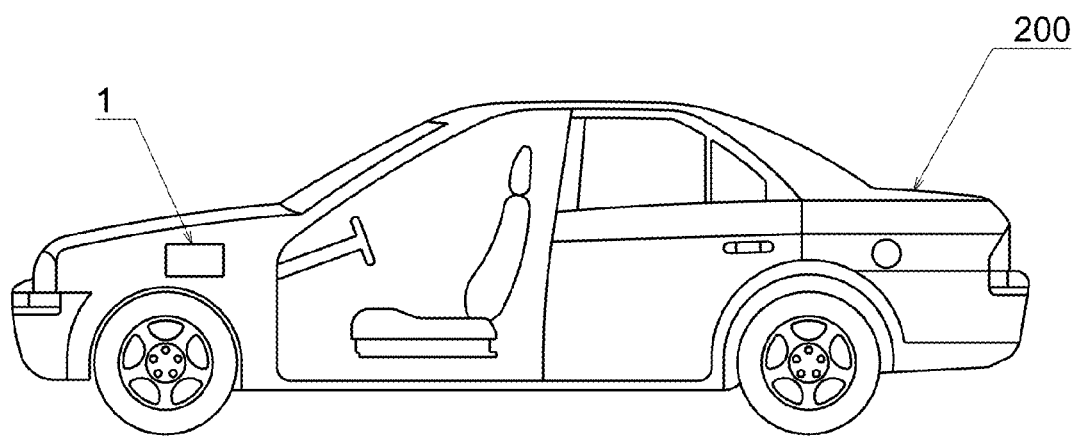
FIG. 1 is a side and partially cutaway view of a vehicle with an electrochemical voltage source.

FIG. 2*a*) is a perspective view from above of a flow system of the temperature control system of FIG. 2, partially opened;

FIG. 3*a*) is a perspective view of a temperature control module in a housing with the outer dimensions of an individual cell and a temperature control component arranged therein, partially opened;

FIG. 3*b*) shows a second embodiment of a temperature control module with too temperature control components, accommodated in a common housing in the form of an individual cell, with an upstream air conduit in the form of a second, empty adjacent individual cell; and FIG. 4 is a top plan view of the voltage source of FIG. 2 with a package of individual cells, wherein some of the individual cells have been replaced by temperature control modules in accordance with FIGS. 3*a*) and *b*).

DESCRIPTION OF THE INVENTION

The present application claims the benefit of priority of DE 102011120640.3, filed on Dec. 9, 2011; DE 102012015213.2, filed on Aug. 3, 2012; and DE 102012020518.3, filed on Oct. 19, 2012 incorporated by reference herein for all purposes. The present invention can, in particular, be used as a voltage source for a vehicle 200 in accordance with FIG. 1. A vehicle comprises any system for transporting people or goods, such as for example, by road, water, rail and air, in particular, cars, ships and automotive vehicles.

An electrochemical voltage source 1 according to FIGS. 1, 2 and 4, supplies electricity to an electrical load. Such a load could be, in particular, an electric drive motor, an electric starter motor or an emergency power generator. Examples of electrochemical voltage sources are batteries, accumulators, fuel cells or similar electrochemical energy storage systems. Voltage sources of this type can have various shapes, such as for example, cylindrical, or in this case, in the shape of a rectangular parallelepiped.

An electrochemical voltage source 1 comprises at least one individual cell 6 to produce an electric voltage. Preferably a plurality of individual cells are provided. The voltage available overall can be increased by electrically connecting the cells in series. The individual cells are preferably rectangular parallelepipeds and arranged adjacently in one or more rows 16. Air gaps 60 are preferably formed between the individual cells, in particular between the rows 16 formed by the cells.

Preferably, the voltage source 1 is provided with a housing 2. A housing is a means for enclosing the one or more individual cells 6 to prevent electrical voltage from being unintentionally applied to the environment and to protect the individual cells from moisture and pollution. Preferably, there is a non-destructive way of opening the housing. For this purpose, it is preferably provided with a cover (removed in FIGS. 2 and 4). Preferably, housing 2 is hermetically sealed in operation. Depending on the operating mode, however, a fluid flow with suitably temperature-controlled air can be introduced into housing 2 and exhaust air can be removed. The housing is preferably made of plastic, in particular a fiber-reinforced synthetic resin.

The voltage source 1 comprises at least one temperature control system 3. The object of the temperature control system is to increase, decrease or maintain the temperature of the voltage source, or to homogenize the temperature within the voltage source. For this purpose the temperature control system preferably introduces heat into the voltage source, transports heat to the outside or distributes it inside. A temperature control system 3 can therefore comprise a heating means 43, a cooling means 47, an flow-through means 4, or other tempering components 75, or can be formed therefrom. To increase operational safety through redundancy or to simplify the complexity of the device, it is also possible to arrange several temperature control systems 3 in a voltage source, preferably at point or axis symmetrical positions to each other.

Preferably the voltage source 1 is formed such that a fluid 5, or a space for passing a fluid through, is at least provided at predefined intervals. The fluid 5 is preferably air. Water-based systems or cooling agent from refrigeration machines are also conceivable.

Preferably, a temperature control system 3 comprises at least one flow-through means 4. In this case, flow-through means refers to a means specifically used for changing the composition or the flow of a fluid 5 in a particular surface or spatial area near to or inside the voltage source. At least parts of a flow-through means 4 are preferably located close to the individual cells 6, for example along the interface between the individual cells 6 and a wall of the housing 2. Preferably flow-through means 4 also comprises air gaps 60 between the individual cells.

Preferably, flow-through means 4 is provided with at least one fluid guiding means 5. A fluid guiding means in this context refers to a means for directing air from an area inside or outside of the voltage source to a fluid moving device or vice versa, in particular, in at least one direction between a zone to be temperature-controlled and a fluid moving device or along a zone to be temperature-controlled. A fluid guiding means comprises, for example, a tube a conduit made of hard plastic, an elongated cavity in a wall of the voltage source housing or a flexible and/or elastic sheathing, the flow cross section of which remains at least partially open for a fluid flow even under mechanical load. For this purpose, a suitable collapse-preventing means 62 is preferably provided. Examples of a suitable collapse-preventing means are studs or web-like profiles in a sheathing, or series-connected articulated conduit sections of hard plastic, as shown in FIG. 2a).

Preferably the voltage source comprises several fluid guiding means. One or more of which are formed, for example, as conduit elements conforming to the dimensions of the individual cells. A conduit can, for example, have the same size as an individual cell. It can, however, also comprise the area of an individual cell, only partially filled by a fluid moving device 44 arranged therein.

Preferably, a fluid guiding means 45 comprises one or more passage holes 46. They become preferably either larger and/or more numerous as the distance from the fluid moving device increases. In this way homogeneous air flow over the entire length of the fluid guiding means 45 can be ensured, even though fluid pressure decreases as the distance from the fluid guiding means increases.

Preferably, the passage openings are arranged to be positioned at least partially in alignment with air gaps 60 between the individual cells 6. By these means, a fluid 5 can be efficiently transported into the inside of the voltage source 1 or a fluid can be extracted from inside the voltage source.

Preferably, at least one flow-through means 4 comprises at least one fluid moving device 44 for temperature control of the voltage source 1. A fluid moving device is understood to be a device used to apply kinetic energy to a fluid in order to move the fluid from one place within the voltage source to another place within the voltage source, or to exchange fluid between the interior of the voltage source and its environment. Preferably, they include flow machines with blade wheels, in particular fans, preferably radial fans. In the case of liquids, flow machines with radially expelling blade wheels are particularly suitable.

A fluid moving device 44 preferably has a flat design, to enable one or more fluid moving devices 44 to fit into the housing of an individual cell to form a temperature control module or to be arranged space-savingly at or in the wall of housing 2. Preferably, the structural height of the fluid moving device is approximately one to five times the wall thickness of housing 2, preferably double the wall thickness at most.

Preferably, at least one fluid moving device 44 is arranged at the end face of the rectangular-parallelepiped or cylindrical voltage source. This enables the voltage source to be temperature-controlled from all sides with only short distances. In this case, the fluid moving device is preferably attached to or integrated into housing 2. Alternatively or additionally, at least one fluid moving device 44 can be arranged inside the voltage source, for example as a plug-in component in a space provided for an individual cell.

A fluid moving device is preferably manufactured of plastic, at least in part, in order to keep weight low. To increase thermal stability, however, it can be advantageous for it to be at least partially manufactured of metal. This applies, in particular, to the blade wheel and the housing.

If the fluid moving device 44 comprises a blade wheel, which should advantageously be arranged in a rotation plane perpendicular to one of the rotation axes of the battery. Particularly preferred is a rotation plane perpendicular to the longitudinal axis of the voltage source. In axially expelling flow machines, the fluid can thus be distributed without substantial lateral deviation. In the case of flow machines with an at least partial radial expulsion of fluid, a fully enveloping distribution around the voltage source and its respective individual cells can be achieved easily and homogeneously.

If a fluid moving device 44 is arranged in place of individual cells inside the voltage source, the rotation axis of the fluid moving device is preferably perpendicular to the base of the individual cells. In this way, the largest possible blade wheel diameter within the cell dimensions can be achieved.

A construction with few components suitably requires only one single fluid moving device 44 per voltage source. It can, however, be advantageous to provide several fluid moving devices in one voltage source, to reduce flow distances and flow resistance.

Preferably, at least one fluid moving device 44 is associated with at least two fluid guiding means 45, one of which is preferably connected to the intake side and the other to the output side of the fluid moving device 44. By these means, it is possible for the fluid moving device 44 to take air in from a larger area and to distribute the intake air in a different place over a larger area again. A fluid moving device 44 together with two fluid guiding means 45 forms a first flow system 41. The fluid moving device 44 is thus coupled with an intake means 51, 51' to transport fluid 5 for temperature control to voltage source 1 and with a return means 52, 52' for extracting fluid 5 following temperature control of voltage source 1.

Several flow systems of this type can be arranged in one voltage source. Thus, for example, several flow systems are arranged parallel to the base of the voltage source and parallel one above the other between the housing 2 and the individual cells 6, as shown in FIG. 2 on the left. In this way, an efficient flow can be achieved in the space between the block of individual cells 6 and the housing 2 of the voltage source 1.

Preferably, at least two fluid guiding means 45 are arranged on at least one intake side of a fluid moving device 44, and at least two fluid guiding means are provided on the output side of the fluid moving device 44, as shown in FIG. 2 on the right. What is meant here is that, regardless of whether a common connection area exists, at least one branch is provided at which the transported fluid flow is separated or combined. Preferably, the fluid guiding means are arranged such that the fluid guiding means are alternately connected to the output and intake sides. This applies to their arrangement inside the voltage source or on the circumference of the voltage source. In this way homogeneous uniform mixing can be achieved, for example, by generating diagonally intersecting fluid flows. This type of system integrates the two flow systems described above, wherein in this case one single fluid moving device fulfills the task of at least one further fluid moving device with the use of just one fan.

Preferably the temperature control system comprises at least one heating means 43. In the simplest case it is a heat source. Preferably, it is combined with a flow-through means. The heat source can be a resistive heater, the warm side of a Peltier element, a fan heater or a hot air flow supplied from outside the voltage source 1. The heating means can be either arranged centrally on a fluid moving device 44, for example as a PTC heating module of a fan heater. It can, however, also be arranged in or along a fluid guiding means 45, for example as shown in FIG. 2a) in the form of a heating wire which is helically wound around the fluid guiding means. Preferably, a heating means is only arranged in a fluid guiding means if the guiding means at least intermittently has to supply fluid to the voltage source 1.

Preferably, the temperature control system 3 comprises at least one cooling means 47. In the simplest case, is is a heat sink. It is preferably combined, however, with a flow-through means. The cooling means can be, for example, the cold side of a Peltier element, the expanded air of a compressor, or the heat absorbing end of a heat pipe.

Preferably, the housing of the voltage source comprises at least one heat passage means 90. A heat passage means is understood to be a means enabling the easier passage of heat energy between the inside of the voltage source and its environment than is possible in any other area of the housing of voltage source 1. In the simplest case, it can be one or more passages through which air can be exchanged between the voltage source and the environment, for example by means of a fan. However, in the case of voltage source housings that have to be completely, in particular, hermetically sealed, to enable the transfer of heat energy through the walls of the housing, heat conducting plates, heat exchangers, heat pipes. Peltier elements or the like, can be provided in or on the housing of the voltage source. Part of the housing wall could also be replaced by one of the mentioned components. If the heat passage means comprises one or more Peltier elements, it is possible to adjust the direction of the heat flow according to the situation. If the voltage source is to be heated, the Peltier elements are energized so that their cold side faces the environment and is warmed thereby. A fluid flow to be supplied to the voltage source is directed past the warm side. If the voltage source is to be cooled, the Peltier elements are switched over so that the cold side cools the inside of the voltage source and, on the warm side, heat is dissipated to the environment of the voltage source by means of radiation, convection or e.g. by means of a heat exchanger. It is also conceivable to dissipate waste heat using compressed air from a compressor with or without providing an opening in housing 2, as the temperature of expanding air drops significantly.

Preferably, the temperature control system 3 comprises at least one temperature control module 70. It is a module with at least one temperature control function, arranged in the voltage source 1 in place of one or more individual cells 6. Thus, changes to the housing of the voltage source 1 are not required. In addition, the electrical contacts provided for the individual cells 6 can be used to supply power to the temperature control modules and merely have to be connected up to a different circuit. Replacement is also easily carried out in the event of a repair. To achieve the most efficient distribution of air and power, preferably module slots are chosen for this purpose that are located in corners, preferably opposing corners, or located centrally with respect to the overall cell arrangement. Preferably, temperature control modules are mounted such, that an air flow results that circulates along the housing wall of the voltage source 1, or partial air flows result around the individual cells 6.

Temperature control modules 70 are preferably integrated into a housing of a plug-in module to enable insertion in the voltage source in the same way as the individual cells.

A temperature control module 70 can be equipped with one, two or more fluid moving devices. They can, in particular, be axial and/or radial fans. In the output direction, a heating module with the outer dimensions of an individual cell is preferably arranged in alignment with the outflow direction of the fluid moving device. This can be one or more resistive heaters, in particular PTC heating elements, or cooling components such as, for example, Peltier elements. Such a heating module 72 is preferably provided with at least one air intake opening on the side facing the air moving module and with at least one air output opening on the opposing side.

It can be provided that the temperature control modules 70 are arranged on opposing sides of the voltage source 1. It can be provided that they are operated uniformly to achieve a cumulative effect, in other words, both blowing air or both extracting air. It can also be provided that they are at least temporarily operated in different manners, to increase the efficiency of the entire system, such as, for example, blowing air into the voltage source or between the individual cells and extracting the input air in a different place.

The fluid 5 thus circulates inside the voltage source 1 in one or more closed circuits within a closed fluid circuit system. The component parts of the fluid circuit system, i.e. the fluid and its walls, are arranged entirely within or directly on the voltage source, preferably along the outer or inner side of the housing wall or within the walls of the housing.

In the present exemplary embodiment, temperature control systems are only provided at vertical walls of the voltage source. It is also possible, however, additionally or alternatively, to provide corresponding temperature control systems or temperature control components at the bottom or top of a voltage source. Temperature control modules can also optionally be provided or active in the voltage source in addition to the temperature control systems at the walls or alternatively thereto, for example to generate air flows near and along the bottom plate or the top.

A temperature control system according to the present invention can be operated in various operating modes.

In a first operating mode, in a first operating phase, a fluid is sucked in at suction point 54, 54' by a fluid guiding means 45 operating as a area means 52, 52' in the area of the housing wall. The fluid transports undesirably temperature-controlled fluid 5 from air gaps 60 between the individual cells 6 away from the individual cells. In this way, for example, undesirable heat energy can be efficiently removed also from the interior of the voltage source. The fluid 5 then flows through the return means into fluid moving device 44. From there, the fluid is fed to a fluid guiding means 45 operating as a feed means and is again supplied to the interior of the voltage source through feed point 53, 53'. The feed point is preferably remote from the suction point. Preferably, the suction point and the feed point are located on different sides of the voltage source, preferably on opposing sides of the voltage source. A fluid flow in a first direction is thus created between the suction point and feed point.

In a second operating phase the flow direction is reversed. That is, the feed means becomes the suction means and the original suction means becomes the feed means. As a result, the fluid flow inside the voltage source flows in reverse direction to the original first flow direction.

Alternate switching back and forth between these two operating states ensures a homogeneous temperature distribution in the inside of the voltage source. Suitable time periods required for each operating phase are dependent on the dimensions of the voltage source. In the case of standard car starter batteries and batteries for electric vehicles, they are preferably between 5 and 15 minutes.

If the temperature inside the voltage source is to be not just homogenized but also lowered, a cooling means 47 can be additionally connected to the flow-through means 4. The cooling means extracts heat from the fluid 5 and transports it by means of heat conducting plates, heat exchangers, heat conducting pipes or Peltier elements through the battery housing to the outside.

If the temperature of the voltage source 1 is to be increased, a heating means 43 can be additionally connected, which heats the fluid 5 flowing through the flow-through means 4. By these means, the heat input and its homogenous distribution into the inside of the voltage source can be carried out much more efficiently than is possible by only heating the housing from the outside.

In a second operating mode, as described above, a fluid is supplied to the voltage source through a feed means in a first operating mode, and is transported back to a fluid moving device by means of a return means. Preferably, the suction points and feed points are selected in such a way that, in the first operating phase, a fluid flow is created through the voltage source and in particular between the individual cells, with directional components in at least too axial directions of the voltage source, preferably from a first edge of the voltage source to a diagonally opposing second edge of the voltage source.

In the second operating phase, the flow is not reversed in the feed or return means. Instead, the two are switched off and a second flow system with a second feed means and a second return means is put into operation. In this way, a fluid flow is created inside the voltage source that differs from the first fluid flow in its direction, spatial occurrence and distribution. This promotes a homogeneous distribution of temperature inside the voltage source.

The second operating phase with an arrangement in accordance with the left side of FIG. 2, the parallel arrangement of two separate flow systems, one on top of the other, results in two fluid flows which are essentially planar, parallel to the arrangement plane of the individual cells, but on different levels.

In arrangements in accordance with the right side of FIG. 2, the active suction and feed means are located on different levels with respect to each other. By these means, a fluid flow that is not parallel to the bottom is already created in the first operating phase. In the second operating phase, the insulting second fluid flow in the voltage source is inclined with respect to the fluid flow of the first operating phase. The flow direction of the first fluid flow is thus intersected by the preferable positioning of the feed and suction openings on corresponding offset diagonal edges.

Alternatively or additionally, in a further operating state, temperature control modules 70 can be additionally connected. Fluid circulation between the individual cells is thus promoted.

The following is advantageous for temperature control of electrochemical voltage sources:
a) Generating a fluid flow by means of a fluid moving device 44.
b) Guiding temperature-controlled fluid 5 in or to the voltage source 1 and simultaneously extracting the waste fluid 5 out of or from the voltage source 1.
c) Extracting or supplying heat from or to the fluid flow.
d) Moving a fluid 5 in one or more closed circuits arranged exclusively inside or close to the circumference of the voltage source 1.

It can be provided that fluid moving devices are arranged on the same level as the arrangement plane of the individual cells 6 and that they, at least partially, take in or output fluid parallel to the arrangement plane of the energy storage cells. It can, however, also be provided that temperature control systems or components are arranged outside the plane of the individual cells and that they introduce or output heat and/or fluid flows perpendicular to this plane. This enables the fluid flows to be rapidly supplied to ail the individual cells simultaneously.

It can also be advantageous to create a fluid flow between the individual cells which is perpendicular to the arrangement plane, to redirect this fluid flow between the energy cells and the housing walls in a plane flowing parallel to the bottom or top, to then redirect this flow in the opposite direction via the vertical housing walls and to condition it in any manner desired on the opposite side of the arrangement plane (i.e. top or bottom) in order to then, once again, blow the conditioned air into the space between the individual cells.

LIST OF REFERENCE NUMERALS

1 electrochemical voltage source
2 housing
3 temperature control system
4 flow-through means
5 fluid
8 individual cell
16 rows
41 first flow system
42 second flow system
43 heating means
44 fluid moving device
45 fluid guiding means
46 passage hole
47 cooling means
51, 51' feed means
52, 52' return means
53, 53' feed points
54, 54' suction points
80 air gap
82 collapse-preventing means
70 temperature control module
72 heating module 75 temperature control component
90 heat passage means
100 handle of voltage source
200 vehicle

The invention claimed is:

1. A temperature control system for an electrochemical voltage source, wherein the temperature control system comprises:
   at least one heating means;
   at least one cooling means;
   a fluid moving device for moving a fluid and circulating the fluid within the voltage source;
   a first fluid guiding means that is a first tubular conduit connected to the fluid moving device and defining a feed means in a first operating mode for transporting the fluid moved by the fluid moving device to the voltage source for temperature control of the voltage source; and
   a second fluid guiding means that is a second tubular conduit connected to the fluid moving device and defining a return means in the first operating mode for extracting the fluid after the temperature control of the voltage source;
   wherein in a second operating mode, a flow direction of the fluid is reversed so that the first fluid guiding means defines the return means and the second fluid guiding means defines the feed means, and
   wherein the voltage source comprises a housing that is hermetically sealed in operation, and
   wherein the first fluid guiding means is located along a first wall of the housing, and the second fluid guiding means is located along a second wall of the housing, the first wall being located opposite the second wall.

2. The temperature control system according to claim 1, wherein the temperature control system comprises at least one temperature control module arranged, within the voltage source in place of at least one individual cell for carrying out at least one temperature control function.

3. The temperature control system according to claim 1, wherein the first fluid guiding means and the second fluid guiding means are part of at least one closed fluid circuit system, and components of the closed fluid circuit system are entirely inside or directly adjacent to the voltage source.

4. The temperature control system according to claim 1, wherein the voltage source comprises individual cells for producing a voltage, and
   wherein a fluid flow is created between the individual cells that is generally perpendicular to a plane of arrangement of the individual cells when the fluid is extracted from the voltage source.

5. The temperature control system according to claim 1, wherein, one or more passage holes that are located along a length of the first tubular conduit define a feed point and one or more passages holes that are located along a length of the second tubular conduit define a suction point,
   wherein the fluid moving device is located on a wall that is generally perpendicular to both the first wall and the second wall.

6. The temperature control system according to claim 5, wherein the one or more passage holes in the first tubular conduit, the second tubular conduit, or both are generally aligned with air gaps between individual cells producing a voltage.

7. The temperature control system according to claim 1, wherein the voltage source includes at least one heat passage means so that the fluid can be exchanged between the voltage source and an outside environment.

8. The temperature control system according to claim 1, wherein the at least one heating means is arranged either centrally on the fluid moving device or in, or along, the first fluid guiding means, the second fluid guiding means, or both.

9. A vehicle, wherein the vehicle is provided with the temperature control system according to claim 1.

10. A temperature control system for an electrochemical voltage source, wherein the temperature control system comprises;
   i. a first fluid moving device for moving a fluid and circulating the fluid within the voltage source for controlling a temperature of the voltage source;
   ii. a tubular first fluid guiding conduit connected to the first fluid moving device and defining a feed means in as first operating mode for transporting the fluid moved by the first fluid moving device for temperature control of the voltage source, the first fluid guiding conduit having one or more passage holes;
   iii. a tubular second fluid guiding conduit connected to the first fluid moving device and defining a return means in the first operating mode for extracting the fluid after the temperature control of the voltage source, the second fluid guiding conduit having one or more passage holes;
   iv. at least one heating means for increasing or maintaining the temperature of the voltage source; and
   v. at least one cooling means for decreasing or maintaining the temperature of the voltage source,
   vi. a second fluid moving, device for moving a fluid within the voltage source,
   vii. a tubular third fluid guiding conduit connected to the second fluid moving device for transporting the fluid moved by the second fluid moving device, and
   viii. a tubular fourth fluid conduit connected to the second fluid moving device for transporting the fluid moved by the second fluid moving device,
   wherein in a second operating mode, a flow direction of the fluid is reversed so that the first fluid guiding conduit defines the return means and the second fluid guiding conduit defines the feed means,
   wherein in the first operating mode, the fluid is supplied to the voltage source through the one more passage holes in the first fluid guiding conduit, and the fluid is extracted from the voltage source through the one or more passage holes in the second fluid guiding conduit so that a fluid flow is created between individual cells configured to produce a voltage,
   wherein the fluid flow is generally perpendicular to a plane of arrangement of the individual cells, and
   wherein the voltage source comprises a housing that is hermetically sealed in operation.

11. The temperature control system according to claim 10, wherein the one or more passage holes in the first fluid guiding conduit and the one or more passages holes in the second fluid guiding conduit are located on different sides of the voltage source.

12. The temperature control system according to claim 10, wherein the temperature control system comprises at least one temperature control module arranged within the voltage source in place of at least one an individual cell for carrying out at least one temperature control function.

13. The temperature control system according to claim 10, wherein the one or more passage holes in the first fluid guiding conduit, the second fluid guiding conduit, or both are generally aligned with air gaps between the individual cells.

14. The temperature control system according to claim 10, wherein the first fluid moving device is a radial fan, and
wherein the first fluid guiding conduit is connected to an output side of the radial fan and the second fluid guiding conduit is connected to an input side of the radial fan.

15. The temperature control system according to claim 10, wherein both the first fluid guiding conduit and the third fluid guiding conduit are located along a first wall of the housing, and both the second fluid guiding conduit and the fourth fluid guiding conduit are located along a second wall of the housing, the first wall being located opposite the second wall.

16. A temperature control system for an electrochemical voltage source, wherein the temperature control system comprises:
   i. as fluid moving device for moving a fluid and circulating the fluid within the voltage source for controlling a temperature of the voltage source;
   ii. a tubular first fluid guiding means connected to the fluid moving device and defining a feed means in a first operating mode for transporting the fluid moved by the fluid moving device for temperature control of the voltage source, the first fluid guiding means having one or more passage holes for moving the fluid; and
   iii. a tubular second fluid guiding means connected to the fluid moving device and defining as return means in the first operating mode for extracting the fluid after the temperature control of the voltage source, the second fluid guiding means having one or more passage holes for moving the fluid;
   iv. at least one heating means for increasing or maintaining the temperature of the voltage source; and
   v. at least one cooling means for decreasing or maintaining the temperature of the voltage source,
   vi. a second fluid moving device moving a fluid within the voltage source,
   vii. a tubular third fluid guiding means connected to the second fluid moving device for transporting the fluid moved by the second fluid moving device, and
   viii. a tubular fourth fluid guiding means connected to the second fluid moving device for transporting the fluid moved by the second fluid moving device, wherein in a second operating mode, as flow direction of the fluid is reversed so that the first fluid guiding means defines the return means for extracting the fluid after the temperature control of the voltage source and the second fluid guiding means defines the feed means for transporting the fluid moved by the fluid moving device for temperature control of the voltage source,
wherein the one more passage holes of the first fluid guiding means are located on different sides of the voltage source than the one or more passages holes in the second fluid guiding means,
wherein in the first operating mode, the fluid is supplied to the voltage source through the one more passage holes in the first fluid guiding means, and the fluid is extracted from the voltage source through the one or more passage holes in the second fluid guiding means so that a fluid flow is created between individual cells that is generally perpendicular to a plane of arrangement of the individual cells,
wherein the fluid is extracted from air gaps between the individual cells in the voltage source, and
wherein the voltage source comprises a housing that is hermetically sealed in operation,
wherein the first fluid guiding means is located along a first wall of the housing, the second fluid guiding means is located along a second wall of the housing, and the fluid moving device is located on a third wall of the housing, the first wall being located directly opposite the second wall, and the third wall being locate adjacent the first wall, the second wall, or both,
wherein first fluid guiding means and the third fluid guiding means are arranged parallel to a base of the voltage source and above one another, and
wherein the second fluid guiding means and the fourth fluid guiding means are arranged parallel to the base of the voltage source and one above the other.

17. The temperature control system according to claim 16, wherein the first fluid guiding means and the second fluid guiding means are located on different levels of the voltage source.

* * * * *

UNITED STATES PATENT AND TRADEMARK OFFICE
CERTIFICATE OF CORRECTION

PATENT NO. : 9,448,017 B2  
APPLICATION NO. : 13/705714  
DATED : September 20, 2016  
INVENTOR(S) : Fries et al.

Page 1 of 1

It is certified that error appears in the above-identified patent and that said Letters Patent is hereby corrected as shown below:

On the Title Page

Item (56), FOREIGN PATENT DOCUMENTS, delete "DE 37 02 756 10/1988", insert --DE 37 05 756 10/1988--

Item (56), U.S. PATENT DOCUMENTS, delete "2,756,532 A 8/1956 Awe", insert --2,758,532 A 8/1956 Awe--

Signed and Sealed this  
Tenth Day of January, 2017

Michelle K. Lee  
*Director of the United States Patent and Trademark Office*